(12) United States Patent
Link

(10) Patent No.: US 6,331,743 B1
(45) Date of Patent: Dec. 18, 2001

(54) MAGNETIC FAN CLUTCH HAVING PLASTIC MEMBERS

(75) Inventor: Larry Ray Link, Frankfort, IL (US)

(73) Assignee: American Cooling Systems, LLC, Grand Rapids, MI (US)

(*) Notice: Subject to any disclaimer, the term of this patent is extended or adjusted under 35 U.S.C. 154(b) by 0 days.

(21) Appl. No.: 09/368,131

(22) Filed: Aug. 4, 1999

Related U.S. Application Data

(63) Continuation-in-part of application No. 08/920,569, filed on Aug. 29, 1997, now Pat. No. 5,947,248.
(60) Provisional application No. 60/095,498, filed on Aug. 6, 1998.

(51) Int. Cl.$^7$ .............................. H02K 7/10; H02K 13/02
(52) U.S. Cl. .......................... 310/103; 310/62; 310/232
(58) Field of Search ...................................... 310/103, 105, 310/92, 67 R, 62, 63, 43, 75 D, 232; 192/84.1, 84.951; 123/41.12; 416/32; 464/29; 474/190

(56) References Cited

U.S. PATENT DOCUMENTS

| | | | |
|---|---|---|---|
| 1,548,016 | 7/1925 | La Riboisiere | 310/103 |
| 2,925,739 | * 2/1960 | Urquhart et al. | 74/230.01 |
| 2,931,928 | * 4/1960 | Fehn, Sr. | 310/103 |
| 3,233,131 | * 2/1966 | Stegman | 310/105 |
| 3,552,351 | 1/1971 | Willem | 118/6 |
| 3,751,181 | 8/1973 | Hayashi | 416/132 |
| 3,826,937 | 7/1974 | Davies | 310/105 |
| 3,883,633 | 5/1975 | Kohler | 310/152 |
| 3,924,585 | 12/1975 | Woods | 123/41.12 |
| 3,932,068 | 1/1976 | Zimmerman | 417/420 |
| 4,095,922 | 6/1978 | Farr | 417/313 |
| 4,119,184 | 10/1978 | Mower et al. | 192/82 T |
| 4,152,099 | 5/1979 | Bingler | 417/420 |
| 4,176,630 | 12/1979 | Elmer | 123/41.12 |
| 4,189,654 | 2/1980 | Mourier | 310/72 |
| 4,509,091 | 4/1985 | Booth | 310/10 |
| 4,554,491 | 11/1985 | Plunkett | 318/254 |

(List continued on next page.)

FOREIGN PATENT DOCUMENTS

| | | |
|---|---|---|
| 0 730 337 | 9/1996 | (EP) . |
| 0 899 858 | 3/1999 | (EP) . |
| 2 278 242 A | 11/1994 | (GB) . |
| WO 93/24986 | 12/1993 | (WO) . |

OTHER PUBLICATIONS

Search Report from European Application No. 98116336.3, a counterpart to the present application dated Nov. 13, 1998.

International Preliminary Examination Report from counterpart PCT Application No. PCT/US98/17751 dated Nov. 5, 1999.

*Primary Examiner*—Karl Tamai
(74) *Attorney, Agent, or Firm*—Fitch, Even, Tabin & Flannery

(57) ABSTRACT

A magnetic fan clutch having a magnetic field coupling which uses a light weight, strong plastic driving member and driven member to rotate fan blades which are also made of plastic. The fan clutch also uses a plastic mounting member for attaching to a vehicle. Plastic may be used for a vehicle or truck fan clutch because the magnetic coupling between the series of coils on the driving member and the magnetic elements on the driven member may be modulated to provide a slower torque transfer from zero to a full torque transfer over a longer controlled period of time such as over six seconds to eliminate the relatively sharp impact torque transfer pulse heretofore found in fan clutches. This slower and modulated torque transfer with slippage between the driving member and driven member during the torque transfer period reduces the fast acceleration and the resistant high inertia and torque loads of conventional fan clutches as typically found in vehicles or other heavy duty applications.

9 Claims, 9 Drawing Sheets

U.S. PATENT DOCUMENTS

| | | | |
|---|---|---|---|
| 4,651,922 | 3/1987 | Noba | 236/35 |
| 4,671,739 | 6/1987 | Read et al. | 416/230 |
| 4,760,898 | 8/1988 | Nyquist | 188/161 |
| 4,896,064 | 1/1990 | Taiani | 310/104 |
| 5,045,739 | 9/1991 | Kuwahara | 310/105 |
| 5,053,666 | 10/1991 | Kliman et al. | 310/261 |
| 5,273,143 | 12/1993 | Voss et al. | 192/3.58 |
| 5,307,644 | 5/1994 | Cummins et al. | 62/133 |
| 5,363,912 * | 11/1994 | Wolcott | 166/72 |
| 5,548,173 | 8/1996 | Stephenson | 310/181 |
| 5,565,723 | 10/1996 | Dastidar | 310/103 |
| 5,566,745 | 10/1996 | Hill et al. | 165/299 |
| 5,598,705 | 2/1997 | Uzkan | 60/599 |
| 5,642,797 * | 7/1997 | Wall | 192/84.961 |
| 5,650,679 * | 7/1997 | Boggs, III et al. | 310/105 |
| 5,687,823 | 11/1997 | Nakagawa et al. | 192/84.961 |
| 5,724,941 | 3/1998 | Suzuki et al. | 123/399.15 |
| 5,763,969 | 6/1998 | Metheny et al. | 310/62 |
| 5,900,203 | 5/1999 | Needham et al. | 264/248 |

\* cited by examiner

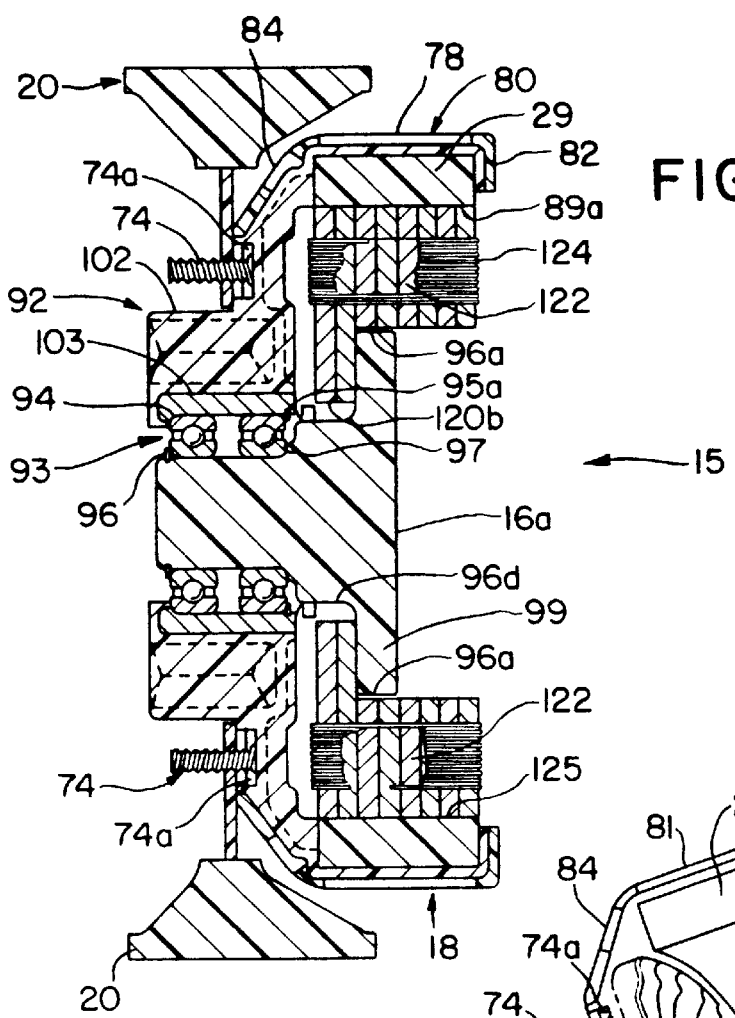
FIG. 1
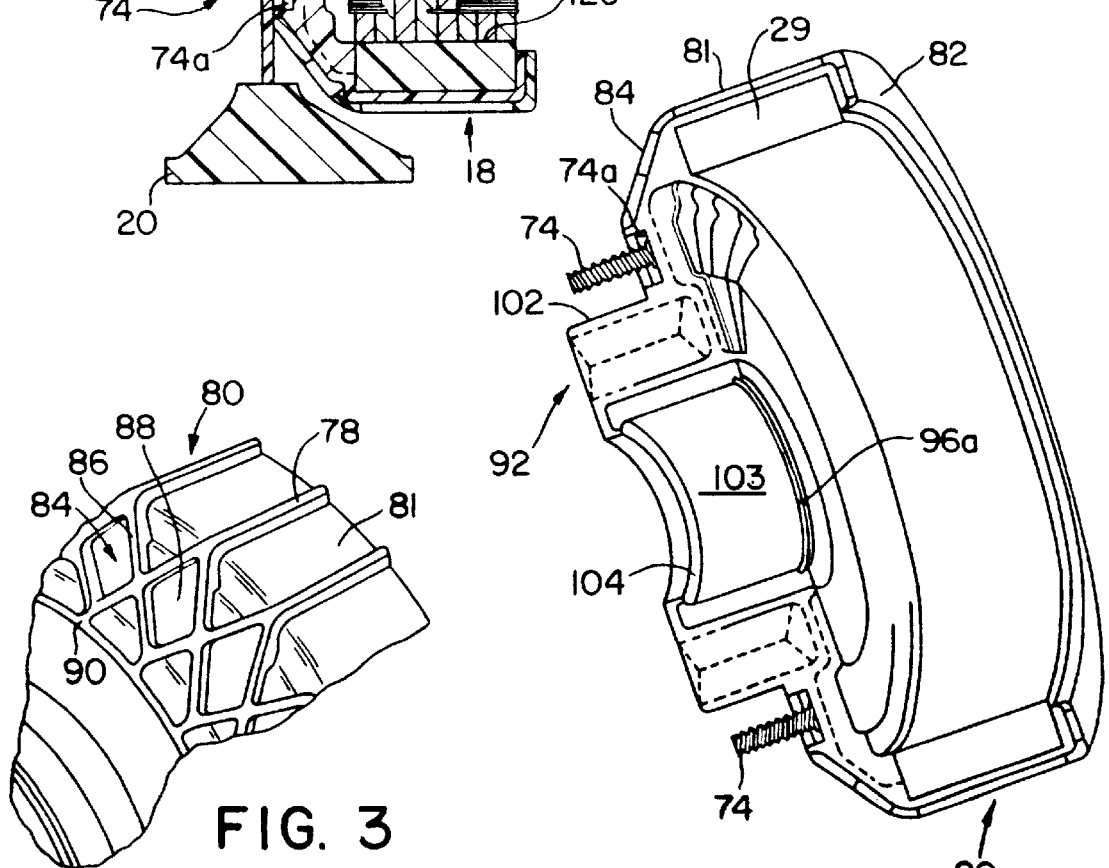
FIG. 3
FIG. 2

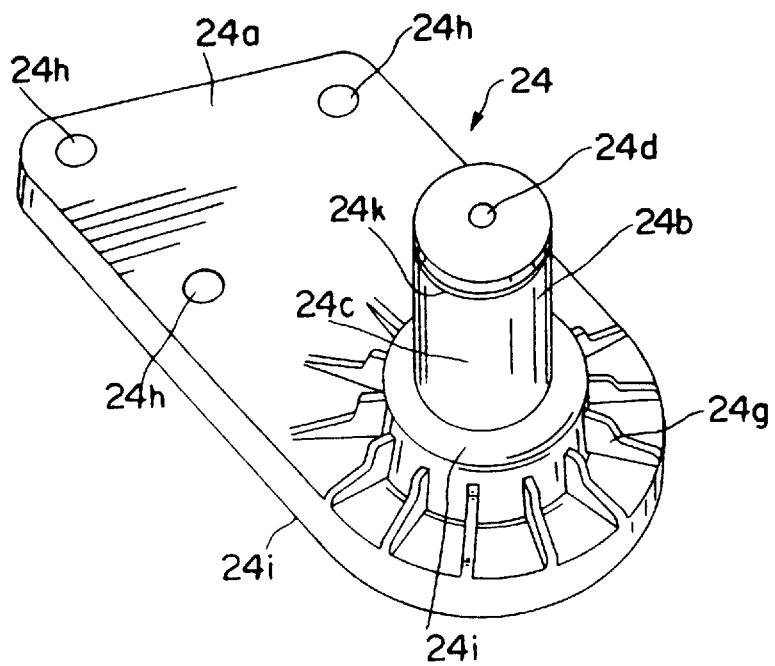
FIG. 7
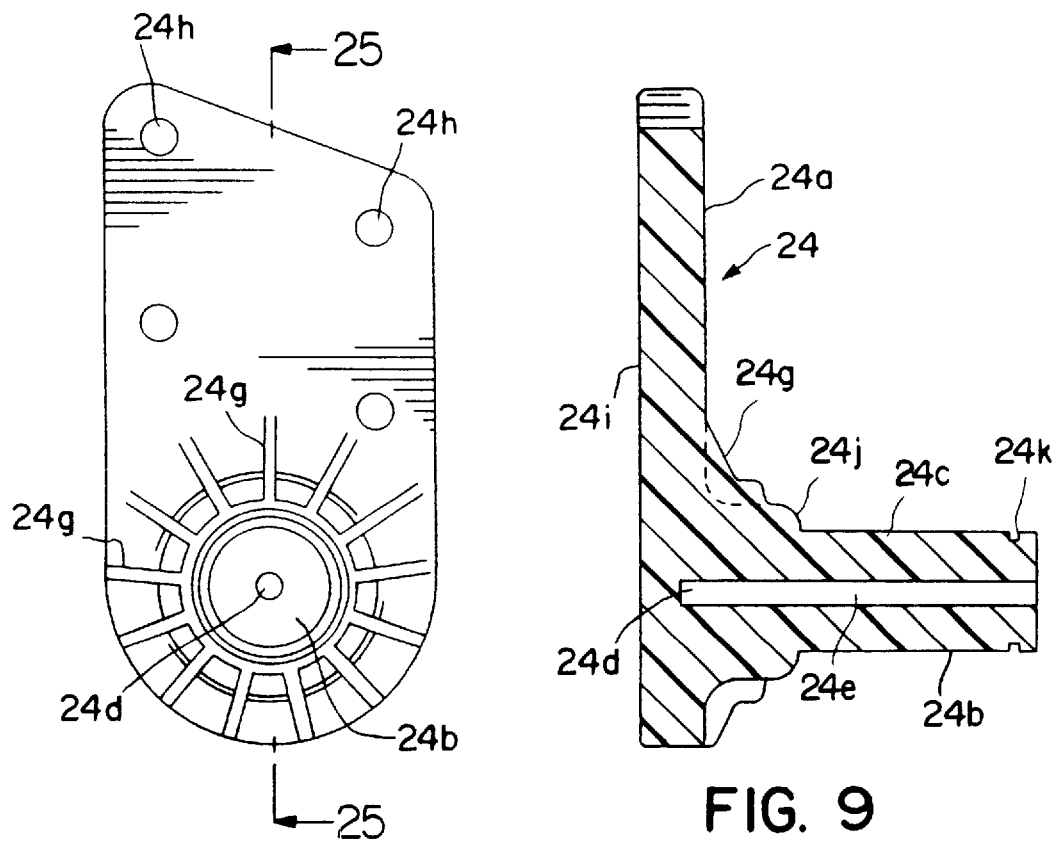
FIG. 8
FIG. 9

MAGNETIC FAN CLUTCH HAVING PLASTIC MEMBERS

RELATED APPLICATIONS

This application claims the benefit of U.S. application Ser. No. 60/095,498, filed Aug. 6, 1998, entitled "Magnetic Fan Clutch" which, in turn, is a Continuation-In-Part of U.S. application Ser. No. 08/920,569, filed Aug. 29, 1997, now U.S. Pat. No. 5,947,248 entitled "Electric Fan Clutch."

FIELD OF THE INVENTION

This invention relates to a magnetic clutch and to its construction, and more particularly, to the use of such a clutch in vehicles or the like.

BACKGROUND OF THE INVENTION

The present invention relates to an improvement of the electromagnetic clutch disclosed in the aforesaid copending application and in particular to the construction of such a clutch having lighter and less expensive components. The clutch of this invention may be substituted for a commonly used fan clutch used in large trucks in the United States which is constructed with heavy metal components with the first component being driven by the pulley and having a frictional face which is clutched to or separated from a second frictional clutch face on the driven metal portion carrying the fan blades. When the clutch faces are engaged they transmit full power without a slippage between the frictional faces. The clutch faces are typically engaged by a pneumatic or electromagnetic actuator with the pneumatic actuator requiring the use of air on the vehicle. Typically, air is available on vehicles such as large trucks but is not readily available on construction or farm equipment which either employ fans and could employ a fan clutch.

The typical ON/OFF conventional fan clutch used for large trucks or the like employs metal machine parts which are relatively heavy and take considerable horsepower to accelerate and to overcome the inertia thereof. For example, when the fan is of a 32" diameter, the horsepower used to drive the fan can be as much as 40 to 80 hp for large trucks which have engines in the range of 200 to 600 hp. The machining of the fan clutch metal pieces also adds considerably to the cost of this fan clutch. The ON/OFF fan clutches also must be relatively strong and made of metal to withstand the torque impulse forces which are applied relatively quickly, e.g., in about 1.2 seconds, when the fan clutch goes from fully off, light torque load to a very high, full torque load to accelerate the fan-carrying part to its maximum speed, which is generally about the engine speed which can be 2400 rpm. Thus, it is necessary to build a fairly substantial metal fan clutch to withstand the shock of the sudden inertia load of the stationary driven clutch base and its attached fan. Consequently, current ON/OFF fan clutches are quite large and are substantially made to withstand such shock loads and high forces when the fan blades are being accelerated to rotate at high speeds and subjected to large centrifugal force loads at high rotational speeds. The metal pulley and fan carrying pieces require considerable machining to provide the desired surfaces, reference locations, and bearing seats. Such machining adds considerably to the cost of this clutch.

The ON/OFF fan clutches use frictional faces which wear and generally need to be replaced after 150,000 miles or so in order to meet the warranty requirements, which warrant the fan clutch for about 250,000 miles. Of course, the replacement of the friction faces results in a substantial amount of down time during their removal and their replacement. In contrast thereto, the electromagnetic fan clutch disclosed in the aforesaid patent application uses only rotational parts rather than frictional parts and uses only a magnetic field to transfer the torque of the rotating input pulley part to the driven rotational part carrying the fan blades. With current ON/OFF fan clutches, the sixty or so horsepower used by the onset of the fan load and the considerable horsepower used to accelerate the fan under an impulse load, for example, of 60 hp to turn a large 32" fan, is noticeable for large trucks climbing a grade. When the fan clutch comes on and takes 60 hp, the engine must slow down and often the driver must shift down two gears to keep the vehicle going. In the electromagnetic fan clutch disclosed in the aforesaid application and in this application, there is a relatively soft engagement which can be controlled so as to avoid the full application of 60 hp over the short impulse time of 1.2 seconds or the like, thereby eliminating the need to downshift.

It appears that these current ON/OFF fan clutches may be engaged at least 12% of the time for large trucks or the like. Since the large truck is using the full extent of the fan horsepower with the ON/OFF clutch, there may be as many as 40 to 80 hp being used to drive the fan when there is relatively small need for full engagement, because a partial engagement would satisfy the cooling needs. It is estimated that the electromagnetic fan clutch disclosed in the aforementioned application, because it can supply a modulated torque of less than full torque and more than a minimal torque, would need to be engaged only about 1% of the time. Further, the magnetic clutch may be modulated to increase the torque transfer gradually to eliminate the large shock loads of the ON/OFF fan clutch.

An additional consideration with the ON/OFF fan clutch is that of the large amount of noise generated by the fan which is rotating at high speeds for 12% of the time. It is estimated that as much as 50% of the noise from a large truck emanates from the fan which is beating or slapping the air as it rotates at about engine speed to cool the engine. A reduction in noise level using a modulated fan clutch could open new markets for equipment using fans and fan clutches where the equipment cannot be used in the evenings or at night if it exceeds regulated noise levels.

In Europe and in other places such as South America there is often used a viscous fluid fan clutch which is always rotating at speeds of 400 to 600 RPM, even when the fan is turned off. That is, the viscous fluid rotates the fan because of the friction and shears. When the viscous fan clutch is turned on, it never is able to produce or transfer 100% of the input power or torque because 7–10% of the power is lost with viscous fluid shearing. Because of the fluid viscosity and friction, this fan clutch is never totally disengaged to be free-wheeling as it is constantly engaged so that it is always using a considerable amount of the power. This power, of course, is wasted fuel consumption, which makes is a relatively inefficient fan clutch from a fuel economy standpoint. This particular fan clutch also uses a bi-metallic thermostat on the front of the fan assembly to measure temperature and a plunger is operated by the thermostatic switch, which requires ram air to operate. On slow moving construction vehicles or the like where there is relatively little ram air, such a thermo-statically controlled fan clutch is not readily usable. Likewise, for an ON/OFF fan clutch used on trucks there is a requirement for the use of compressed air which is often not available for construction or farm equipment and therefore makes the clutch less saleable to makers of such equipment.

Currently, it is desired to eliminate the 7–10% viscous shear inefficiency without an increase size of the radiators and to provide this increased efficiency to power the fan in order to run the engines hotter using the same cooling equipment. The magnetic fan disclosed in the aforesaid parent application can be used with these hotter engines because it transfers 100% of the power using a magnetic field and does not have the 7–10% inefficiencies due to the viscosity of the viscous fluid.

In all of these fans and fan clutch systems, removal of heat is a significant problem for the bearings and for the fan belts. The failure of bearings or the breaking of fan belts are a considerable cause of maintenance or down time. By keeping the bearings and fan belt temperature lower, the life of the belts and bearings can be improved considerably. These are important considerations with respect to the maintenance and the overall down time with respect thereto caused by bearing or belt failures. The replacement of a bearing on a fan clutch is a significant maintenance problem for a truck or a piece of equipment. Thus, there is a need for a new and improved magnetic clutch that overcomes the deficiencies of existing ON/OFF frictional face clutches and existing viscous fluid clutches.

SUMMARY OF THE INVENTION

In accordance with the present invention, there is provided a new and Improved magnetic clutch which is formed with a magnetic field coupling between a driving or pulley element which is made of lightweight, strong plastic and a driven element or fan cover made of lightweight, strong plastic in contrast to the heavy steel or metal pieces used in the conventional ON/OFF clutches having engageable frictional faces. The use of plastic pieces is achieved in part because of a modulated, relatively slow torque transfer from zero torque to full transfer of torque over a controlled period such as 6 seconds versus the relatively sharp impact torque transfer pulse of about 1.2 seconds for the frictional ON/OFF clutch. The slow modulated START acceleration and torque transfer allow the use of small, lightweight plastic components whereas the fast acceleration and high inertia and torque loads of conventional fan clutches require substantial and metal materials.

In accordance with an important aspect of the present invention, the driving pulley part and the driven fan part are preferably made lightweight by using a plastic ribbed or honeycombed construction, as contrasted to a solid piece construction. The honeycomb construction provides strength and large surface areas to transfer heat from the plastic to the ambient air. Preferably, the molded plastic cover and/or pulley are also provided with ribs on their exterior surfaces to stir the air and assist in transferring heat from the part and from its associated bearings.

Preferably, the pulley cover, the clutch mounting bracket, and the driven, fan blade-cover are molded to size and dimensioned to reduce the amount of machining relative to the machined metal pieces of the ON/OFF fan clutches. This reduces the cost of the magnetic fan clutch components. Also, the preferred plastic materials have good strength and heat transfer characteristics. A nylon material filled with about 30–35 glass provides the strength and heat transfer needed and is one of several engineered plastic materials that can be molded to dimension and withstand the high temperatures encountered on a truck or the like.

The magnetic clutch of this invention may be used to transfer torque in other applications than the fan to drive other components on a vehicle. Likewise, the fan clutch can be used on non-vehicles such as fan-cooled air conditioners or the like.

The present invention provides a new and improved fan clutch which is relatively lightweight and made of plastic parts and is constructed to provide good heat dissipating qualities. Unlike the conventional ON/OFF clutches having frictionally engageable faces which interengage with one another and which need to be replaced at about 150,000 miles in order to fill the requirements of a 250,000 mile warranty for a typical ON-OFF clutch, the present invention has no such frictional faces but only rotating surfaces such as the pole pieces and the permanent magnets which are spaced from each other by the air gap. The magnetic field across the air gap causes the driving of the outer driven element having the fan blades thereon without wearable friction surfaces. There is considerable increased reliability where there is no frictional material used. Further, as explained above, the relatively soft engagement where the load is modulated over six seconds from being off to the maximum torque load and a reduction in the percentage of time that the clutch is operating at full load from a 12% of the time for the ON/OFF clutch to an estimated 1% of the time for the magnetic fan clutch results in increased bearing and belt life, which are the two major failures in far clutches today. The softer engagement is accomplished by having the clutch be initially engaged at relatively low torque and increasing the magnetic field gradually over six seconds to the maximum magnetic field.

Unlike the viscous fan clutches used in Europe where there is a viscous shearing loss of 7% to 10% at the upper rotational torque load of the fan, the present invention has no such viscous shearing loss. In Europe and other venues, there is an increasing desire to run the engines hotter without increasing radiator size to dispense the extra heat of the higher temperature engines. If the 7%–10% that is lost with the slippage in the viscous fluid clutches were eliminated, more cooling could be obtained with the same clutch. Also, it will be appreciated that the power lost with viscous shear wastes fuel. Further, the viscous fan drives always run the fan at least 400 RPM due to the friction and shearing action of the viscous fluid used. If an air conditioner is being used, the friction and shearing action of the viscous drive may rotate the fan as much as 600 RPM. This use of power to run the fan at 400 to 600 RPM is a waste of fuel. In contrast thereto, the fan of the present invention is basically off except for the slight frictional bearing and seal drag which may cause the ram air to turn the fan blade at up to 70 RPM.

The present invention allows the use of a signal from a controller 400 such as the ECM controller presently used with engines which provides a 50 Hertz signal to the control circuit for the electromagnetic clutch. The electromagnetic clutch does not require the compressed air as do the conventional ON/OFF clutches having the frictional faces and therefore is readily used on slow moving equipment which usually lacks any compressed air source. The viscous fan clutches are generally not used on slow moving construction equipment or farm tractors or the like, there is no high speed ram air flow which will successfully operate the bi-metallic strip plunger to open a valve.

The fan noises generated is very substantial. In fact, it is thought that as much as 50% of the overall truck noise comes from the fan being slapping the air as it is turned at high speed. Of course, the greater the speed at which the fan is turning, the more hp is being used which reduces the fuel efficiency and the higher speed of the fan the greater noise that is being generated. Rather than driving the fan continuously at high engine speeds as in the ON/OFF clutch arrangement using frictional surfaces, the engine can be operating at high speed and the electromagnet fan clutch can be rotating the fan blades at a relatively lower speed because of the magnetic field slip drive. That is, the amount of magnetic force controls the amount of actual hp being used to drive the fan and the fan speed is not tied directly to the engine speed, unless so desired. In some countries, such as in Europe, significant noise specifications restrict the use of motorized equipment that can be operated after 6:00 PM in metropolitan areas. This applies to construction equipment as well as possibly to trucks. The lower fan noise from a magnetic fan clutch will help meet these noise specifications.

The present invention would also be of considerable importance to reducing the noise being generated by fans and air-conditioning systems in large buildings which have extremely noisy compressor rooms where the compressors are running for long periods of time generating great noise.

Because the belt life of the present invention may be doubled as the may be the bearing life, the present invention is also extremely useful for remote operations, such as oil pumping rigs, where a belt break can result in a high maintenance cost, including significant downtime. Failure of bearings is also another important breakdown failure in such remote areas.

Also, the present invention is of particular use in diesel engines where there is a waste gate which returns exhaust gas back into the engine such that the engine temperature comes up fast. With the present invention, this can be sensed and the fan clutch can be modulated to keep the engine temperature more even and to anticipate the heat increase with opening of the waste gate.

BRIEF DESCRIPTION OF THE DRAWINGS

As shown in the drawings for purpose of illustration:

FIG. 1 is a cross-sectional view taken through the electromagnetic fan clutch which is constructed in accordance with the first embodiment of the invention;

FIG. 2 is a perspective view of a plastic cover for use in the electromagnetic fan clutch of FIG. 1;

FIG. 3 is a fragmentary, enlarged view of a rim portion of the plastic fan cover shown in FIG. 2;

FIG. 7 is a perspective view of the mounting plate for mounting the fan clutch to an engine;

FIG. 8 is a plan view of the mounting plate of FIG. 7;

FIG. 9 is a cross-sectional view taken through the mounting plate of FIG. 7;

DESCRIPTION OF THE PREFERRED EMBODIMENTS

Figure 4:
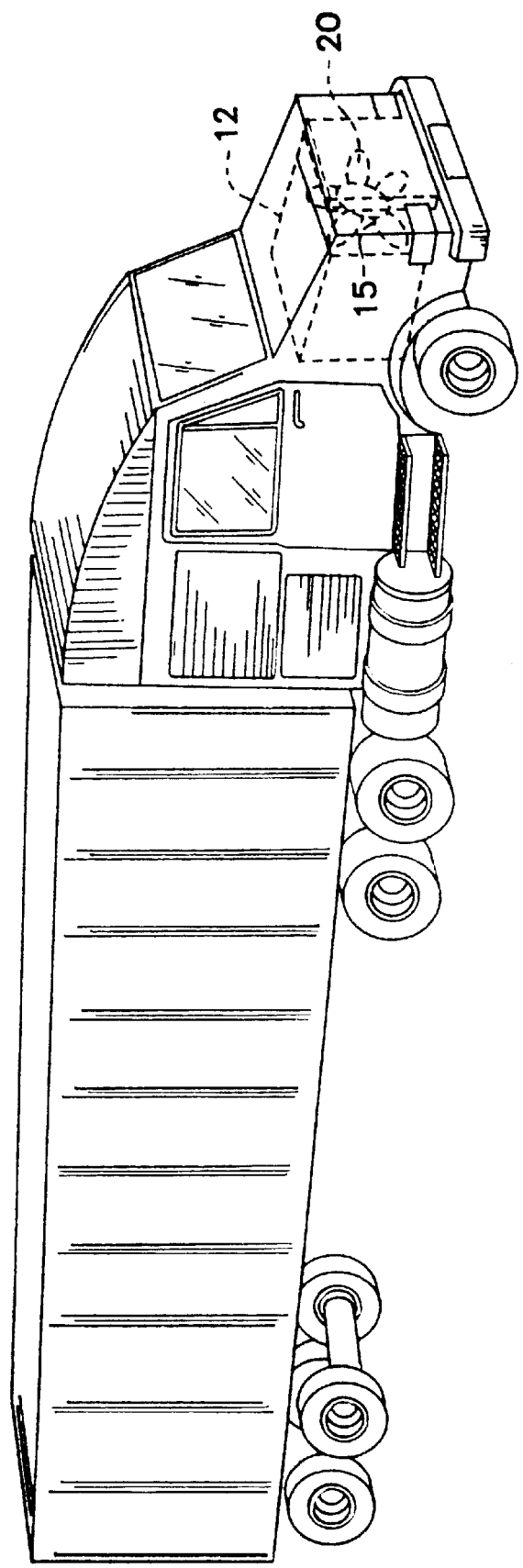
FIG. 4 is a diagrammatic view of a vehicle, such as a truck, having an electromagnetic clutch system embodying the novel features of the preferred embodiment of the invention.

As shown in the drawings for purposes of illustration, the invention is embodied in a magnetic fan clutch system 10 (FIG. 1) such as may be used with an internal combustion engine 12 (FIG. 4) used with vehicles such as a truck or heavy equipment vehicles such as a bulldozer, backhoe, farm tractor, etc. or with stationary power plants having an internal combustion chamber such as a diesel engine or other type of engine which drives a large fan for cooling. In the heavy equipment area, the current fans are connected directly to the water pump and are driven continuously and are not provided with a fan clutch. The fan clutches currently used on trucks in the United States require compressed air to engage clutch frictional faces; but there is no compressed air available on heavy duty, slow moving equipment to operate such a fan clutch. In Europe and South America, a viscous fluid fan clutch is used and is operated by a thermostatic device having a bi-metallic, operated plunger which relies on heavy ram air flowing across the bi-metallic, thermostatic device for proper operation of the clutch. In slow moving, heavy duty equipment there is no such ram air pressure to allow the use of such a thermostatic switch device.

In accordance with the preferred invention, there is provided a magnetic fan clutch 15 which is formed with a magnetic field coupling a driving or pulley element 16 (FIGS. 5 and 6) which is molded of lightweight, strong plastic to a driven or fan cover 18 (FIGS. 1 and 2) which is made of lightweight, strong plastic in contrast to the heavy steel pieces used in the conventional ON/OFF clutches having engageable friction faces. In accordance with the preferred embodiment of the invention, there is a relatively slow, gradual torque transfer (i.e., a "soft engagement") of these plastic clutch elements which means that the clutch goes from OFF or no torque to full torque over a relatively long period of time, such as 6 seconds versus the sharp impact torque transfer pulse of the ON/OFF frictional faces of a clutch which typically transfer from zero to full torque over a period of about 1.2 seconds. This faster pulse transfer of torque of the common ON/OFF system necessitates the use of metal parts to withstand the loads and also applies high torque loads to the bearings and to the fan belt which decreases substantially their respective lives. Because of the more gradual torque transfer of the magnetic clutch, it is able to be made with lightweight, plastic materials rather than the heavy steel materials.

Figure 5:
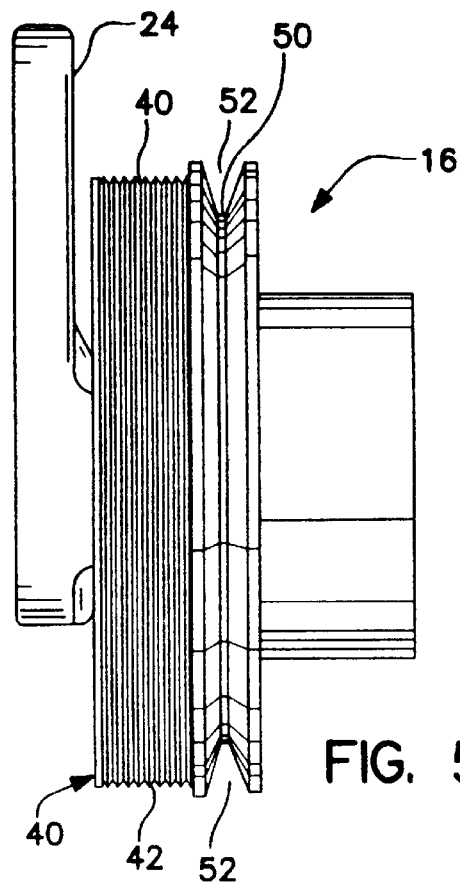
FIG. 5 is a side elevational view off a mounting plate with a plastic molded pulley for the magnetic fan clutch of FIG. 2.

In accordance with the preferred embodiment of the invention, an engineered, molded plastic, mounting bracket 24 (FIGS. 5 and 6) is used to mount the fan to the engine 26 rather than the heavy steel bracket of the prior art. The driven cover element 18 (FIG. 2), which carries magnetic elements 29, is also made of engineered, molded polymer plastics. Likewise, the drive or pulley 16, shown in FIG. 5, is made of molded plastic and carries electromagnets 28 which co-operate the magnetic elements 29 to couple the fan blades 20 and cover to rotate when the pulley 16 is rotated. Because these elements are molded to size and relative precise dimensions with stop or reference shoulders thereon, it is possible to eliminate many of the secondary machine operations used to machine the steel parts to size or dimensions in conventional fan clutches. The preferred engineered plastic material is nylon filled with glass to provide greater strength.

Figure 6:
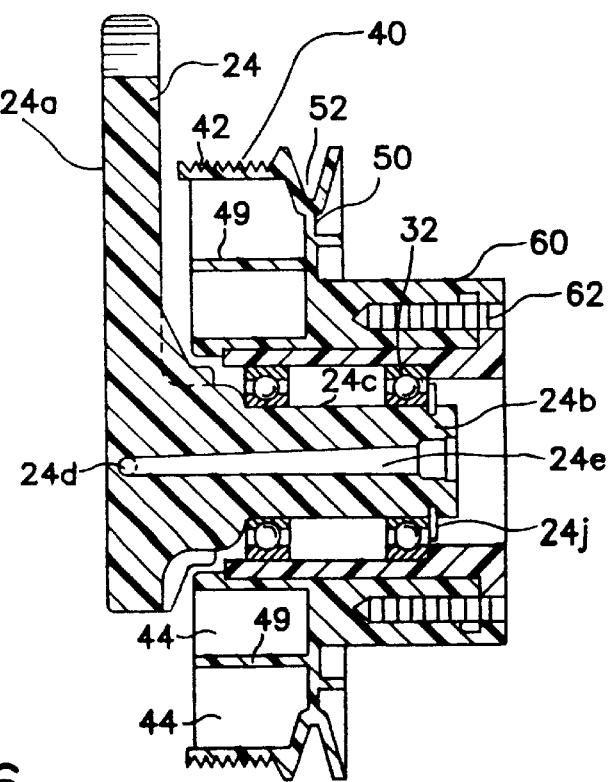
FIG. 6 is a cross-sectional view of the mounting plate and plastic pulley of FIG. 5.

In accordance with another important aspect of the invention, the driving pulley 16 and the driving fan cover 20 are provided with ribs or cooling fins which are rotated to stir the air and to transfer heat from their respective supporting parts to lower the temperature of their bearings 32 and 93 (FIGS. 1 and 6) in order to improve the life of the bearings. Air stirring ribs 56 (FIG. 8) act as fan blades to stir air on the molded sleeve to transfer heat from the sleeve and its bearings 32 (FIG. 6). The cover 18 has ribs 78 and 86 (FIGS. 14 and 4) to stir the air and transfer heat from the cover and its supporting bearings 93 (FIG. 1).

Figure 11:
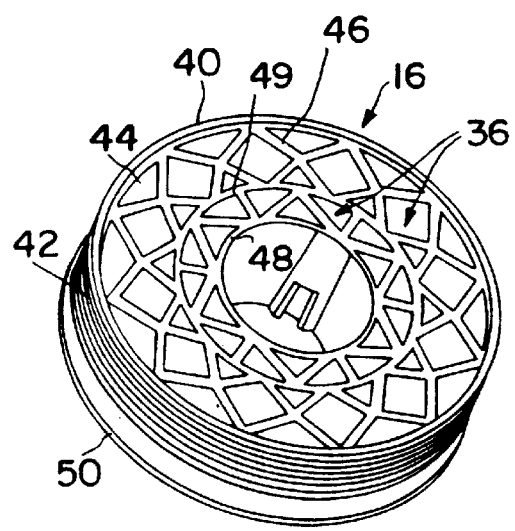
FIG. 11 is a perspective view of the pulley element of FIG. 10 showing the opposite side thereof.
Figure 14:
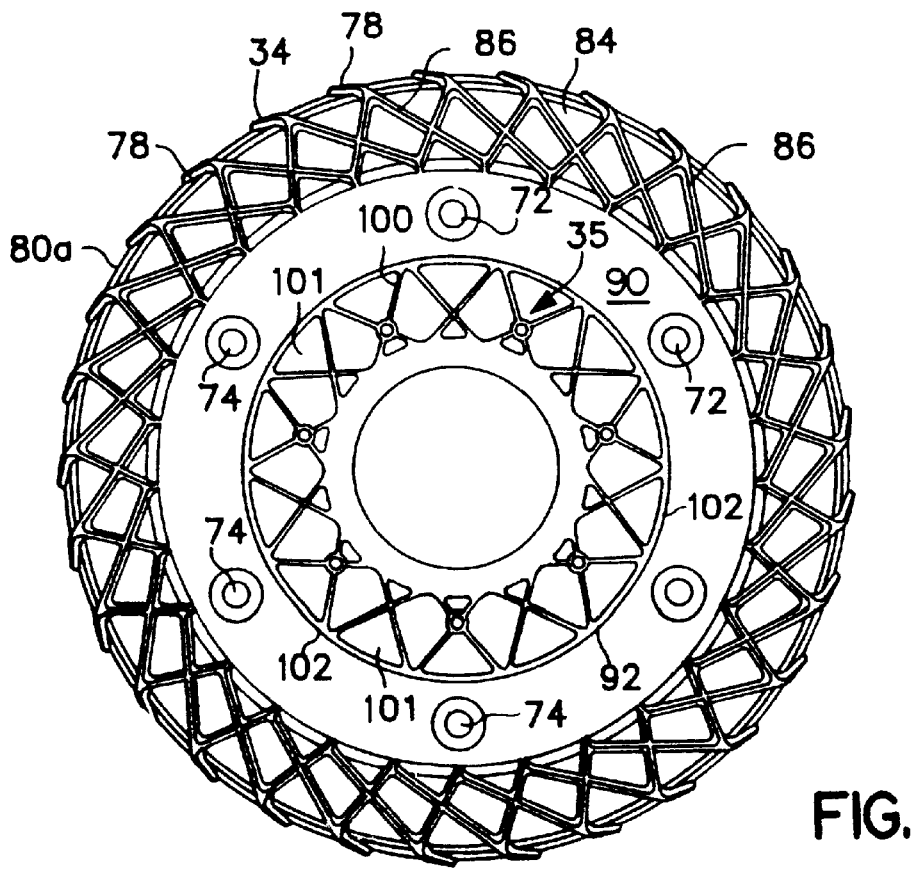
FIG. 14 is a front elevational view of a molded plastic cover element constructed in accordance with one embodiment of the invention.
Figure 15:
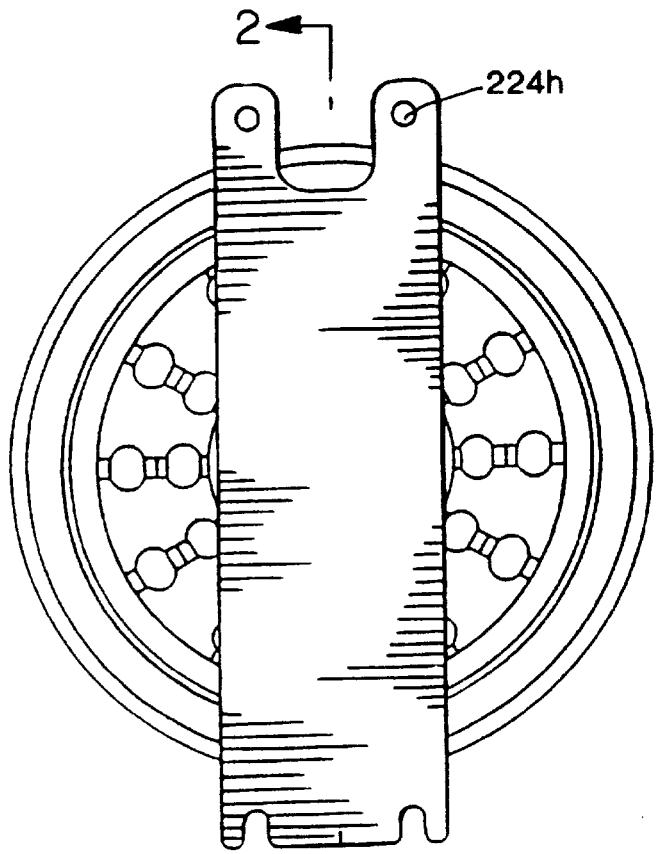
FIG. 15 is a front elevational view of a mounting plate and a magnetic fan clutch having a generator and constructed in accordance with a second embodiment of the invention.

Additionally, the molded, plastic pulley 16 and fan cover 18 are preferably made with a ribbed, honeycomb construction which provides a lighter weight piece than a solid piece and provides large surfaces to transfer heat from the plastic to the ambient air. More specifically, the cover 20 is shown in FIG. 14 with a honeycomb section which is identified by the general reference character 35. The pulley 16 is provided with large honeycomb sections 36, as best seen in FIG. 11. Thus, both the cover and sleeve have lightweight honeycomb sections with large surfaces to radiate heat to surrounding air and fins on rotating parts to transfer heat by convection and to dissipate heat into the ram air.

In the embodiment of the invention illustrated in FIG. 6, the fan clutch is similar to that described aforementioned co-pending application except that the parts are now made of an engineer mold plastic rather than metal and that the number of magnetic areas has been increased. In a second and preferred embodiment which will be described in connection with FIGS. 15–18, the fan clutch system is provided with a generator 35 which generates power for the magnetic fan clutch 15 and which absorbs heat and radiates air outwardly from the bearings, as will be explained in greater detail hereinafter. Thus, it will be seen that the fan clutch system, including the clutch itself and the generator 35, are constructed to dissipate heat to keep the plastic materials from being degraded by heat and also to improve the life of the fan belt and of the bearings.

As shown in the drawings, the electromagnetic fan clutch system 10 is mounted on the engine by a mounting bracket 24, which in this instance is formed of a nylon plastic available from BSAF Corporation located in the U.S.A. having about 30% to 35% glass fill, and preferably 35% glass-filled by weight. The glass-filled nylon is very strong and will support the fan clutch system because the fan clutch pulley 16 and cover 18 are also made primarily of light weight engineered polymer materials and are formed with the honeycomb sections 35 and 36. This is in contrast to the conventional steel mounting brackets used in the prior art which were much heavier. As best seen in FIGS. 7–11, the molded plastic mounting bracket has an integral, flat plate portion 24a and a lower projecting nose or hub portion 24b with the bearings 32 being mounted on a cylindrical surface 24c of the hub. The bracket 24, shown in FIG. 6, includes a side bore 24d for an electrical lead coming in from a side of the plate 24a into a central bore 24e in the hub 24d for electrical wiring when a slip ring 24s is used to provide power to the electromagnets 28 on the driven cover 18.

The mounting bracket 24 is shown in greater detail in FIGS. 7, 8 and 9 and includes a series of projecting ribs 24g radiating outwardly between the plate portion 24a and the hub portion 24c. The ribs 24g provide strength to the hub portion while reducing the overall weight from a solid portion of equal size. Preferably, the mounting plate is also provided with a series of apertures 24h for receiving bolts to mount a flat plate side 24i against the engine or other portion of the vehicle. A molded shoulder 24j at the end of the small diameter portion of the hub serves as a stop for abutting the innermost side of the bearings 32. The other outer side of the bearing 32 will be held by a retainer inserted into a molded groove 24k (FIG. 6), encircling the outer distal end of the mounting hub 24c. This groove 24k, shoulder stop 24i, and bolt holes 24h can be formed fairly precisely by molding only without machining because the mounting bracket 24 is molded to size and dimensions whereas metal pieces would have to be machined to have corresponding surfaces and parts.

Referring now to FIGS. 5, 6, 10 and 11, the preferred and illustrated pulley 16 is formed to be lightweight, strong and to dissipate heat, not only by radiation but also by convection by causing air movement by its fins. It will be appreciated that the bearings 32 are mounted within the driving part 16 and that the heat generated by the bearings should be dissipated to prevent the bearings from being hot and having a lower life. The bearing life can be quite extensive in the present invention because of the light weight of the pulley and the bearing loads thereon and because the heat is dissipated to keep the bearing temperature low. If the heat is not dissipated, the life of the bearings could be substantially below the desired goal of 30,000 to 40,000 hours of operation, or up to 1,000,000 miles of operation for the life of the bearings 32.

The illustrated pulley portion has a rim 40 of cylindrical shape with a grooved peripheral surface 42, which is adapted to be engaged and driven by the fan clutch belt to rotate the driving sleeve 16 about an axis through the center of the mounting bracket hub 24c. The sleeve rim 40 is supported by the honeycomb section 36 which makes the pulley strong and lightweight and supports the forces at the rim 40 as well as sucking heat from the bearings. The honeycomb section 36 is defined by a plurality of open spaces 44 of generally triangular shape formed between spaced ribs 46, as best seen in FIG. 11. In a smaller diameter, inner honeycomb section, the preferred ribs 46 are usually in the shape of triangles and extend outwardly between an inner cylindrical wall 48 and a second intermediate cylindrical wall. An outer honeycomb section is formed between the intermediate cylindrical wall 49 and an outer larger diameter wall 47 at the outer cylindrical rim 40. The honeycomb spaces 44 defined by the rib 46 extend inwardly and laterally for substantially most of the distance of and beneath the one rim's grooved surface 42 to an outer, larger diameter flange wall 50, as best seen in FIG. 6. The outer, larger diameter flange wall 50 has an integral deep V groove 52 therein, as best seen in FIGS. 5 and 6 for receiving a V-shaped drive belt driven by the engine.

It will be appreciated that the air which is flowing in and out of the spaces 44 between the ribbed triangles will cool the surfaces of the triangles and this provides a large cooling surface area for dissipating heat. The torque applied and the frictional contact applied to the outer surface by the belt also generates heat as well as does the internal bearing 32. The life of the belt is increased because the torque load is kept low as a result of the light weight of the pulley 16 and as a result of the temperature of the belt being keep from becoming very hot as would deteriorate the belt material.

The preferred pulley is likewise made of nylon with a 35% glass-fill and is available from BSAF Corporation, located in the U.S.A. The nylon is a good dissipater of heat and the engineered plastic pulley can be molded to fairly precise dimensions without a large amount of machining in contrast to the machined metal pulley and driver portions of the commonly-used conventional ON-OFF fan clutches.

Figure 10:
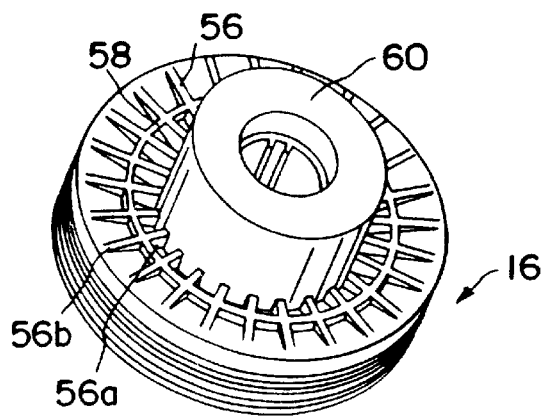
FIG. 10 is a perspective view of the pulley element showing a first side thereof.
Figure 16:
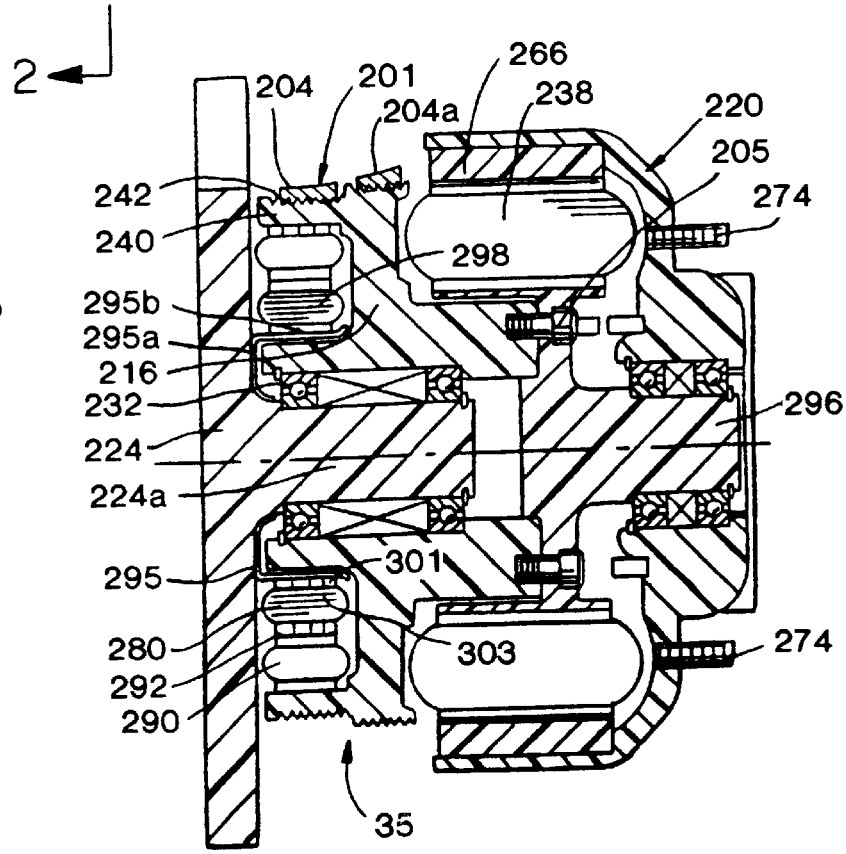
FIG. 16 is a cross-sectional view showing the fan clutch and generator with the mounting plate of FIG. 15.

As the sleeve 16 is rotated, air is stirred in the honeycomb section 36 and heat is dissipated and drawn therefrom by radially extending ribs 56, FIG. 10, which extend from inner large end portions 56a at a projecting hub 60 through very small end portions 56b adjacent the outer rim flange 50. The ribs 56 are joined to one another by a central annular ring 58 molded integral with the ribs and with the flange 50. The projecting central hub 60 of the pulley 16 is integral with the larger diameter rim portion 40 and has a relatively thick cross section in the radial direction, as best seen in FIG. 6, to allow a series of holes 62 to be bored and threaded therein. The threaded holes 62, shown in FIG. 6, to receive threaded fasteners for attachment of a pulley extension 16a (FIG. 1), which will be described in greater detail hereinafter. The pulley extension 16a is fastened to the pulley and acts as part of the pulley as though integrally formed on the pulley piece. In FIG. 16, fasteners 205 are shown connecting a pulley and a pulley extension and similar fasteners would be threaded into the threaded holes 62 in FIG. 6 to secure the pulley extension 16a to the pulley 16 described immediately above.

From the foregoing, it will be seen that the pulley portion is very lightweight construction formed with the honeycomb wails to provide large open spaces and surfaces which not only provide great strength but allow the heat dissipation and that the radial ribs 56 act as fan blades to stir the air to cause additional heat convection away from the pulley as the pulley is rotated at high speeds, for example, up to 2400 RPM by the engine.

The rotating pulley 16 carries the set of first magnet elements, which in this instance, are electromagnets 28, which create a magnetic field and establish a driving relationship with magnetic field elements 29, preferably steel bars or members 29a, carried on the rotating driven cover 18 which is in the form of an annular cover having a ribbed shape and having the fan blades 20 attached thereto or integrally molded onto the cover. The preferred molded cover is lightweight and low cost with high durability and preferably is made of nylon which is glass filled by about 35% by weight. By way of contrast, the illustrated fan without the fan blades has a weight of slightly over 3 pounds, which is a weight reduction at least 5 pounds if the cover were aluminum. The illustrated cover has about a nine inch outer diameter and a width of about 4.125 inches and has nine fan blades 20. Manifestly, these sizes and dimensions can be varied. As previously described in connection with the mounting bracket 24 and the pulley 16, it is preferred that the cover be a precisely molded part to avoid expensive machining. The preferred magnetic elements 29 are in the form of steel bars 29a, as best seen in FIGS. 1 and 2, of rectangular shape which are molded in situ during the molding process of the cover so that the bars may be precisely positioned and held in place without the use of separate fasteners or machining to otherwise precisely locate them. The rectangular, bar-shaped magnetic elements 29 are spaced equidistantly from one another about the circumference of the cover. In the aforementioned patent application, six bars of steel were illustrated, and in this preferred and the other embodiment to be described hereinafter there are preferably twelve steel bars 29a as well as twelve electromagnets 28 on the pulley driving pulley 16.

The driving cover 18 is preferably provided with molded, in situ, threaded fasteners 74, as best seen in FIG. 14, to secure the fan blades 20 to an annular wall 76 of the cover, as best seen in FIGS. 1 and 2. It is preferred that heads 74a of the fasteners are molded in situ so that they are precisely positioned and will he held against turning so that only threaded fasteners need to be applied to the threaded shanks 74 when attaching the fan blades 20. The fan blades have broken off in these figures and naturally will extend to the desired length, e.g., to make a 32 inch diameter fan.

To pull heat away from the cover 18 as it is rotating, it is preferred to provide ribs on the cover including the outer ribs 78 which are integral with and extend across the outer cover rim 80 curved peripheral surface 81, as best seen in FIGS. 1 and 14. The ribs project radially outwardly from outer circumferential surface 80 of the cover rim, which also has a depending flange 82 at one side thereof against which is abutted one end of the steel bars 29a, as best seen in FIGS. 1 and 2.

To keep the outer rim wall of the cover strong yet fairly thin in cross section thereby reducing the amount and weight of plastic and also the amount of heat retained by the plastic, an inclined outer side wall 84 of the cover rim, as shown in FIG. 2, is provided with a series of strengthening, torque line ribs 86 which are integral with the wall 84 and project outwardly therefrom to define spaces 88 bounded by the ribs. The pattern of the ribs 86 is to extend along oppositely inclined intersecting torque lines so as to provide the requisite strength at the areas most stressed by torque when the cover is rotating the heavy steel bars 29a at high torque loads and high speeds generating substantial centrifugal force. At their upper ends, the torque line ribs 86 are joined to the outer peripheral ribs 78, as best seen in FIG. 3. At their inner ends, the torque line ribs 86 are joined to an annular flange or circumferential edge ring portion 90, as best seen in FIGS. 1, 2, 3 and 14, which carries the fasteners 74.

Figure 13:
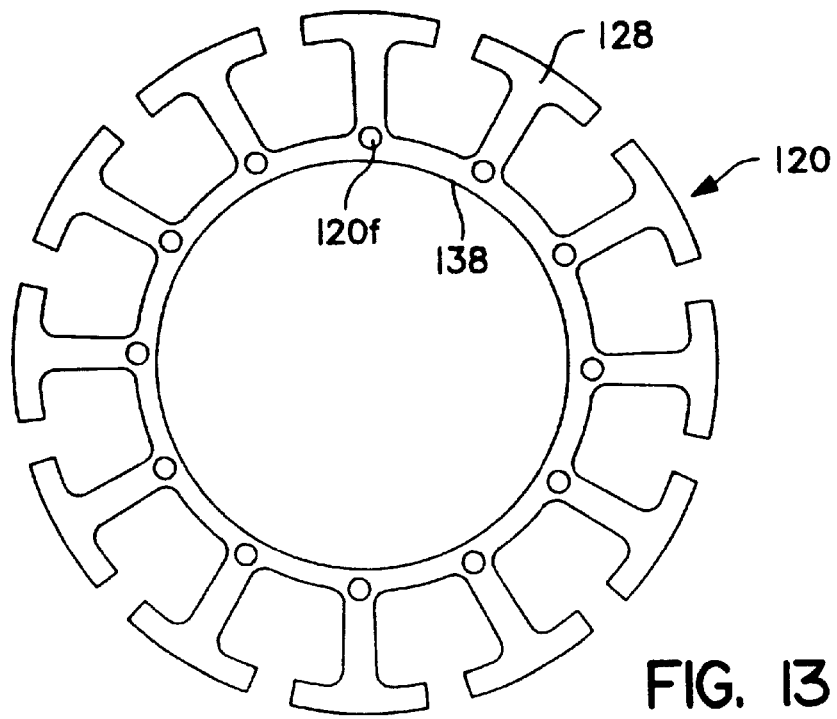
FIG. 13 is a plan view of a second plate used with the plate of FIG. 12 to form the posts for the c coils.

To dissipate heat and to make the cover lighter, it is preferred to provide a honeycombed central hub section 92, as best seen in FIGS. 14, 1 and 13. The inner hub portion receives a bearing 93, as best seen in FIG. 1, which is pressed into the hub section 92. The bearing has an outer bearing race 94. The bearing is held in position by an inner retainer ring 95 mounted in a groove 96 in the hub extension 16a. The inner side of the bearing 93 abuts an annular retaining ring 95a seated in an inner groove 96a (FIG. 2) on the cover 18.

Figure 17:
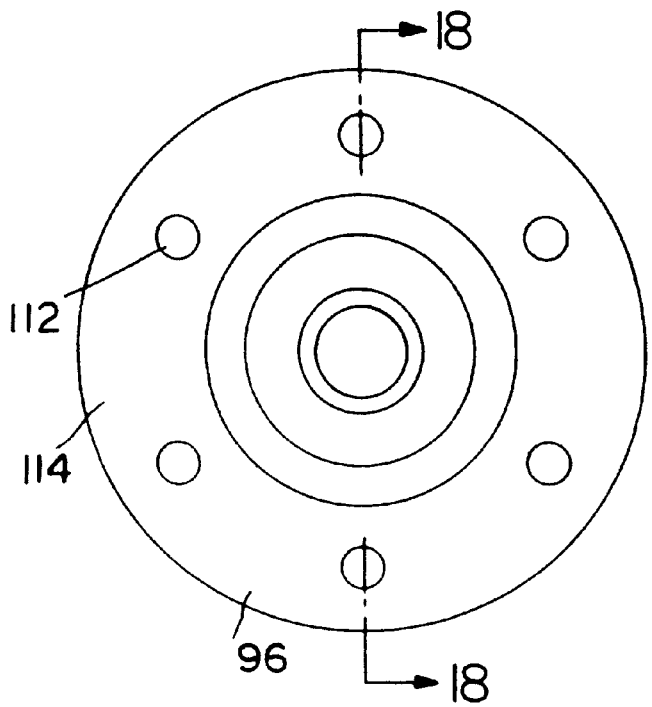
FIG. 17 is a front elevational view of a pulley extension used with the electromagnetic clutch of FIG. 16.
Figure 18:
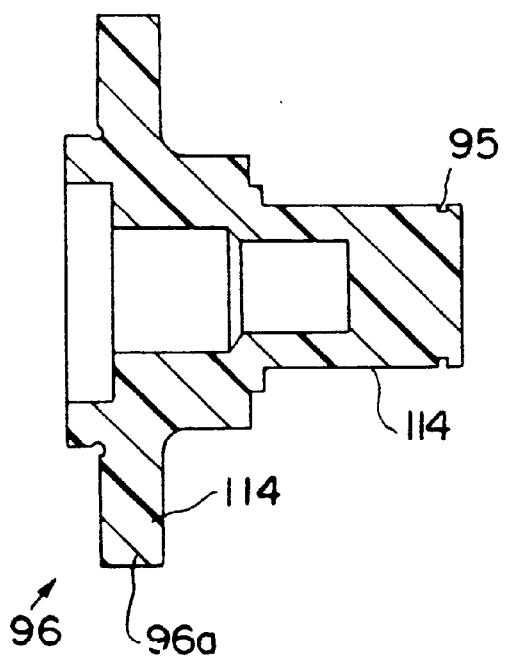
FIG. 18 is a cross-sectional view of the pulley extension taken along the line 18—18 in FIG. 17.

The central rotatable hub portion 92 of the cover 18, which is to carry the bearing 93 (FIGS. 1 and 2) has the honeycomb section 35 defined by ribs 100 (FIG. 14) which define the triangular-shaped spaces 101 about the hub to allow the withdrawing of heat from the bearing 93 to keep the bearing 93 at a relatively low temperature. The ribs and the open spaces of the honeycomb section provide the hub portion with less weight and more surface to dissipate heat than would a solid hub portion of the same dimensions. The hub portion 92 has an outer cylindrical wall 102 joined to the outer ends of ribs 100 and an inner cylindrical wall 103 joined to the inner ends of the ribs. The inner cylindrical wall defines a bearing seat and has a flange 104 to contain the outer race of the bearing. The pulley extension shown in FIG. 17 is an extension of a pulley 16 and is fastened thereto by fasteners inserted through bolt holes 112 in an outer flange 114 (FIG. 17) of the pulley extension 96. The fasteners are threaded into the threaded opening 62 in the hub 60 (FIG. 6). The hub extension is molded as shown in FIG. 18 with a groove 95 to receive the split ring 95a which holds the bearing in place on a nose cone portion 114 of the pulley extension 96. The hub extension is made of engineered polymer such as nylon with glass filling in the range of 30% to 35% to provide the strength and heat dissipation qualities needed. The bearing rotating on the nose cone portion 114 will generate heat. The pulley extension serves as adapter from the clutch to the pulley.

Turning now to the illustrated electromagnets 28, there are twelve of them which have a central core or posts 122 (FIGS. 12 and 21) about which are wound coils of wire 124, the coils 124 having been broken away in FIG. 1 to expose the posts 122.

Figure 12:
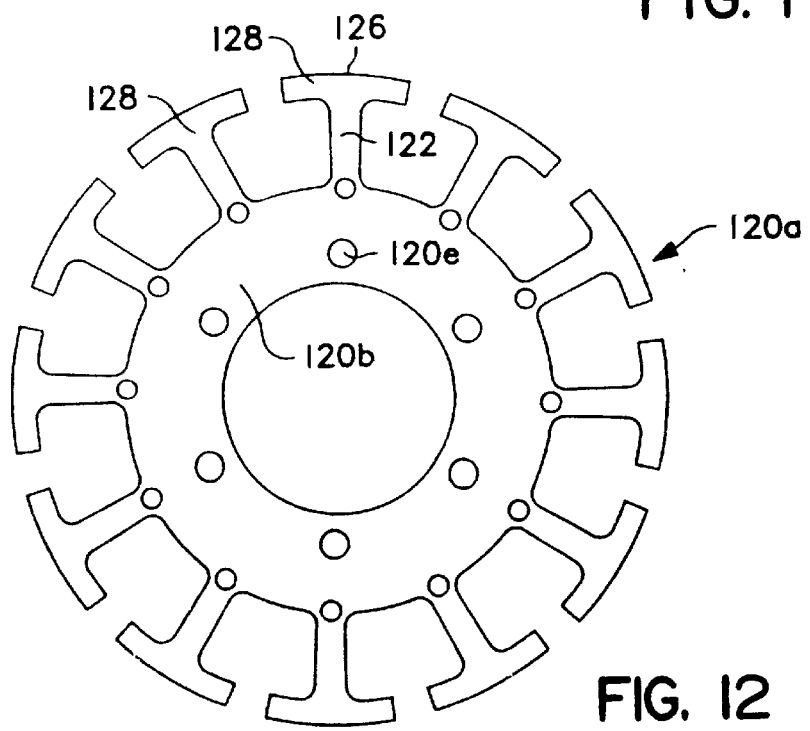
FIG. 12 is a plan view of a metal plate used to form the post for the electromagnetic coils.

In the preferred embodiment of the invention shown in FIGS. 1, 12, and 13, each of the posts 122 for the electromagnets 38 is made with a series of eight, flat metallic pieces abutted one against the other. The posts 122 are radially extending, spoke-like portions 122a of rings 120 and 120a, shown in FIGS. 12 and 13, which are made of a metal such as steel selected for its good magnetic characteristics. One example is a 1008/1010 steel. This 1008/1010 steel is preferred because it is relatively inexpensive and can be obtained in flat sheets which can be stamped into the shapes shown in FIGS. 12 and 13. The eight abutting central electromagnetic soft iron core portions 122 are wound with a wire coil 124, FIG. 1. Relatively large amounts of current are conducted through each of the metallic conductors or coils 124 to provide a large magnetic flex density at a curved outer face 126 on a T-shaped end 128 which is connected to the post portion 122a, as best seen in FIGS. 12 and 13. The face 126 is curved to match the curvature of a curved face 29d of the steel bars 29a, as shown in FIGS. 1 and 2.

Figure 2A:
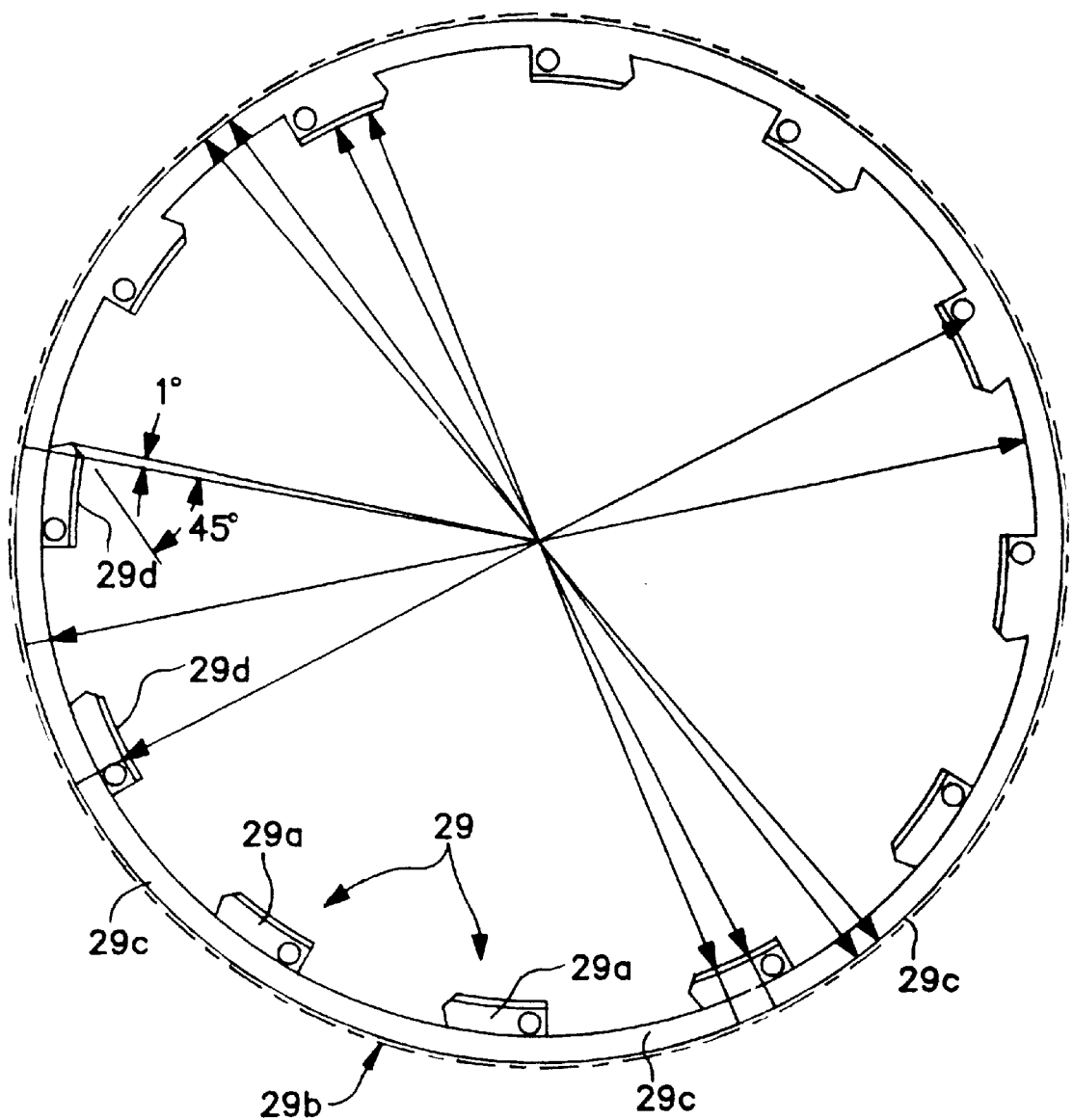
FIG. 2A is a plan view of a steel ring having magnetic bar elements spaced about its periphery.

The magnetic bars 29a may be interconnected and be portions of a steel ring 29b (FIG. 2A). The steel ring is preferably made of a magnetizable steel such as 1008/1010 steel. Small steel strip portions 29c on the steel ring are integral with the steel bars 29a. The magnetic bars 29a are thus spaced from each other by the integral strips. The bars 29a have inner faces 29d which define the air gap 125 with the faces 126 of the electromagnet coils 28. While the steel ring could be made in one piece having a width of about 2 inches, it has been found to be less expensive to stamp out a number of rings of 0.030 thick steel sheet and to rivet the steel sheets together to form a 2 inch thick steel bar 29a from a magnetic conductive laminate for the magnetic element 29.

A small, narrow air gap 125 is defined between the outer faces 29d and the faces 126 on the electromagnetic coils. The magnetic field flows across this gap to connect or clutch the cover 20 to the rotating sleeve. It is preferred that the electromagnetic clutch generate at least 180 newton meters of torque for the U.S. truck market, where the fan may have large fan blades up to 32 inches in diameter. A factor in the design of the magnetic clutch is that the torque curve rises very sharply, being more exponential than linear, from the torque needed for about 20 hp to drive the fan at 1200 RPM to the torque needed at 65 hp at 2400 RPM. In the preferred embodiment, about 600 wire coil turns are wound about each of the posts 122 to provide the desired flux density to achieve the 180 newton meters. The preferred 1008/1010 steel is a low carbon steel that is a good magnetic conductor and does not readily reach saturation for this application. It is desired to avoid permanent saturation. The width of the coiled poles is approximately 2.5 inches in width in this instance. With about 600 turns of 22 gauge wire on the post at 11 amps, there is provided about 4000 amp turns per each of the twelve electromagnets 28 provides the desired 180 newton meters of torque. There is a design constraint not only of material costs but also in the cumulative width of the magnetic fan clutch which is not to be wider than current existing, ON/OFF fan clutches so that the magnetic function may be fitted readily into the existing engines without having to change the size or location of the radiator or other parts adjacent or mounted on the engine. The magnetic fields that can be changed considerably from this illustrated example. Approximately only 120 newton meters is needed for driving the smaller diameter fans common in Europe, which use smaller fan blades and bigger radiators. In the embodiment described herein, the posts weigh about 0.8 pounds thereon, thereby totaling about 1.6 lbs., which will be turning at engine speed which may be at 2400 RPM. It is preferred to keep the wire coils within a rotating diameter of 10 inches so that the coil wires will not fly off the posts when rotating at high truck engine speeds.

In the illustrated embodiment of the invention, the coil metal rings 120 and 120a are shown in FIGS. 12 and 13, with there being six in coil plates 120 shown in FIG. 13 which have a larger diameter opening 138 which is sized to slip over the outer circumferential surface 96a of the hub extension 16a, shown in FIGS. 1 and 18. The metal rings 120a, shown in FIG. 12, are used to secure the coiled metal plates to a flange 99 on a flange 99 of the pulley extension 16a. The rings 120a have bolt openings 120e to receive bolts to secure the rings to the hub flange 99. When bolted to the hub extension 16a, the plates 120a have a smaller diameter inner surface 120b, is adjacent an annular shoulder 96b on the hub extension. Thus, the rings 120 and 120a are mounted with suitable fasteners to the flange 114 through the openings 112 which are aligned with the openings 120e for the flat metal ring 120a of FIG. 12 and for the apertures 120f for the metal plates 120 shown in FIG. 13.

Referring now to a second embodiment of the invention wherein the elements previously identified by reference characters have a prefix numeral 2 or 3 added thereto to distinguish these reference characters from the reference characters used in the previously described embodiment. The second embodiment of FIGS. 15–18 includes a generator 201 which serves to generate electrical power to be used to operate the electromagnets 228 which are opposite the magnetic elements 229 to generate a magnetic field across an air gap 225 between the electromagnetic pole pieces 229 and the magnetic elements. The magnetic elements 229 are made in the same manner as the magnetic elements 29 illustrated in FIG. 2A. Some manufacturers of vehicles do not wish to allow the taking of power such as, for example, 10 amps and 12 volts, from their existing power supplies to power the electromagnetic clutch and therefore the electrical generator 201 has been added to supply the power. The electrical generator 201 is driven by the motor through belts 204 and 204a (FIG. 16) which are meshed within the grooved surfaces 242 on a rim portion 240 of the driving pulley 216. The molded, plastic pulley 216 has affixed thereto a molded, plastic pulley extension 296. The molded, plastic mounting plate at 224 is similar to the molded, plastic mounting plate 24 shown in FIGS. 7, 8 and 9 in that mounting plate 224 has a flat plate portion which is to be mounted to the engine by fasteners through openings 224h. The mounting plate 224 has a central hub or post 224a carrying the bearing 232a which rotatably mounts the pulley driving member 216 which is being driven by the belts 204 and 204a. The electromagnet carrying pulley incurs a pulley-extension portion 296 fastened by fasteners 205 to the driven pulley portion 216. The pulley extension carries the series of flat post plates made of 1008/1010 steel, such as shown in FIG. 2. In a similar series of plates of ferromagnetic material such as 1008/1010 steel are used to form the posts for the inner and outer coils 280 and 290 which are separated by an air gap 292, as shown in FIG. 16.

In the embodiments shown in FIG. 16, the electrical generator inner electromagnets 280 are supported by a stationary metal bracket 295 which has a vertical portion 295*a* fastened to the mounting plate 224 and has a horizontal portion 295*b* which supports the inner rings and the coiled wires 298 about the flat metal rings to form the inner pole pieces 280. The outer electromagnetic coils 290 are secured to the inner side of the rotating sleeve 216 and include metal rings or plates 301 which are wound about by wires 303 to form the inner pole pieces 280. A trickle current, for example, 3 amps is applied to the inner pole pieces 298 and the mechanical energy from the engine is applied through the belts 204 and 204*a* to rotate the sleeve and the outer pole pieces 290 to cause the generation of electrical power which is AC power. A suitable rectifying device is carried on the rotating sleeve to rectify the AC current to DC current which DC current is then fed over conductors to the fan clutch coils 224 of the electromagnetic elements 228. Herein, the illustrated generator uses twenty laminated plates of 1008/1010 steel about 0.030 thick and about twenty-four turns of wire to supply about 50 volts and 8 amps for a magnetic fan clutch used on a large truck with a 32 inch fan. Thus, the rectified AC power being generated by the generator is applied to the fan clutch by the magnetic coil elements. The electrical generator can be constructed to generate 160 volts and 13 amps which is more than is needed to operate the clutch and this additional power can be sent to power other portions of the vehicle, such as lights. This is only an example of the electrical generator and clutch combination and the design and power can be changed substantially from that given herein.

What is claimed is:

1. A magnetically driven fan clutch comprising:

a plastic mount connected to a stationary part of a vehicle and having a central hub for the clutch;

a first rotatable plastic member mounted for rotation and carrying an energizable magnetic field;

bearings on the central hub mounting the first rotatable plastic members for rotation about the central hub;

a series of coils mounted on the first rotatable plastic member for connection to an electrical source to be energized to provide the energizable magnetic field;

a slip ring carried by the stationary mount for providing electrical connection to the rotatable series of coils;

a second rotatable driven plastic member mounted for rotation relative to the first rotatable member;

magnetic elements on the driven plastic member to be magnetically coupled to the energizable magnetic field to rotate the driven plastic member; and plastic fan blades mounted on the driven plastic member for being driven by a magnetic clutch formed by the energizable magnetic field and the magnetic elements.

2. A magnetically driven fan clutch in accordance with claim 1 wherein the first rotatable plastic member includes a pulley portion for being driven by a fan belt to rotate the energizable magnetic field.

3. A magnetically driven fan clutch in accordance with claim 2 wherein the second rotatable, driven member comprises an outer annular rim; and the magnetic elements comprise a circular series of bars embedded in situ, in the outer, annular rim.

4. A magnetically driven fan clutch in accordance with claim 1 wherein honeycomb sections are provided on the first rotatable plastic member to add strength and to reduce the weight of the first rotatable plastic member.

5. A magnetically driven fan clutch in accordance with claim 1 wherein honeycomb sections are provided on the second rotatable, driven plastic member.

6. A magnetically driven fan clutch in accordance with claim 1 including means connected to the slip ring to vary the electrical current being applied to the energizable magnets filled to allow the second rotatable driven plastic member to rotate at speeds substantially less than the speed of rotation of the first rotatable plastic member.

7. A magnetically driven fan clutch in accordance with claim 1 wherein the second rotatable, driven member comprises an outer annular rim carrying the permanent magnets on an inner side of the annular rim; and ribs projecting outwardly from the annular rim and act to create air currents to pull heat away from the fan clutch as the annular rim rotates.

8. A magnetically driven fan clutch in accordance with claim 7 wherein ribs are provided on the first rotatable, plastic member to cause air flow to dissipate heat as the first rotatable plastic member is rotated.

9. A magnetically driven fan clutch in accordance with claim 1 wherein a central annual support is integral with the plastic fan blades and the central annular support is secured to the second rotatable, driver member.

* * * * *